United States Patent [19]
Takahashi et al.

[11] 3,887,024
[45] June 3, 1975

[54] MOTOR VEHICLE DRIVE LINES

[75] Inventors: Koichi Takahashi; Eiichi Abe, both of Yokohama, Japan

[73] Assignee: Nissan Motor Company Limited, Yokohama, Japan

[22] Filed: May 16, 1972

[21] Appl. No.: 253,875

[30] Foreign Application Priority Data
Nov. 12, 1971 Japan.............................. 46-89785

[52] U.S. Cl. ................................. 180/70 P; 64/1 V
[51] Int. Cl........................ B60k 17/22; B60b 17/16
[58] Field of Search ............ 180/71, 70 P, 70 R, 88; 248/358, 20; 64/1 V; 188/1 B

[56] References Cited
UNITED STATES PATENTS

| | | | |
|---|---|---|---|
| 1,961,679 | 6/1934 | Walti | 64/1 V |
| 2,691,283 | 10/1954 | Stover | 180/71 |
| 2,724,983 | 11/1955 | O'Connor | 61/1 V |
| 3,690,399 | 9/1972 | Bokovoy et al. | 180/88 |

FOREIGN PATENTS OR APPLICATIONS

| | | | |
|---|---|---|---|
| 786,789 | 11/1957 | United Kingdom | 180/70 P |
| 488,075 | 11/1952 | Canada | 180/70 P |
| 834,178 | 3/1952 | Germany | 180/70 P |
| 55,250 | 4/1943 | Netherlands | 180/71 |

*Primary Examiner*—Kenneth H. Betts
*Assistant Examiner*—Jack D. Rubenstein

[57] ABSTRACT

An improvement is incorporated in a final drive unit of a motor vehicle drive line with a view to reducing or at least minimizing the unpleasant noises transferred to the vehicle cabin from an axle housing of the motor vehicle. The final drive is thus provided with an inertial mass means which is adapted to provide an additional mass moment of inertia so as to reduce the resonance frequency of the final drive unit to a range within which the torsional vibrations of the final drive unit, particularly the pinion drive shaft, are practically isolated from the vehicle cabin. The inertial mass means may be mounted on any one or even more of a companion flange or a spacer forming part of the final drive unit or a yoke of a rear universal joint.

5 Claims, 15 Drawing Figures

PATENTED JUN 3 1975 3,887,024

SHEET 4

MOTOR VEHICLE DRIVE LINES

The present invention relates to driving systems of motor vehicles and, more particularly, to a motor vehicle drive line connecting a power transmission with vehicle driving wheels.

The motor vehicle drive line is generally made up of a propeller shaft, a final drive unit and axles for the vehicle driving wheels and, in effect, transmits engine power from the transmission through to the driving wheels so as to drive the motor vehicle at a speed with a selected reduction ratio. The propeller shaft is connected to one end to an output shaft of the power transmission via a front universal joint and at the other to a pinion drive shaft of the final drive unit via a rear universal joint. The pinion drive shaft is supported at its front end portion by a pinion driving or companion flange and carries at its rear end a driving pinion gear which is in constant mesh with a ring gear (or a crown wheel as sometimes called) which is rotatable about an axis perpendicular to an axis of the pinion drive shaft. The ring gear, in turn, is in driving engagement with a differential gearing providing right-angle transfer of the power from the driving pinion gear to right and left driving axles. The pinion drive shaft, which is thus connected at one end to the rear universal joint through the pinion driving or companion flange and at the other to the driving pinion gear, is rotatably mounted within an axle housing or pinion carrier through front and rear pinion bearings. These pinion bearings are spaced from each other by means of a spacer which is usually in the form of a sleeve received on an intermediate portion of the pinion drive shaft.

During operation of the motor vehicle, especially during acceleration and deceleration conditions, protracted rattling or whirring noises are produced within the axle housing, varying with the ranges of the driving speed of the motor vehicle. It is known that these unpleasant noises, herein referred to as axle noises, are generated due to repeated impingement between the mating teeth of the driving pinion and ring gears of the final drive unit. This noisy impingement is considered to result principally from the backlash between the teeth of these meshed gears. From a purely theoretical point of view, therefore, it would be ideal to reduce such backlash for the purpose of eliminating the axle noises. This, however, is practically unworkable because of the restrictions which are usually concomitant with the requirement for the production efficiency.

We have, accordingly, conducted experiments with various motor vehicle drive lines in quest of the most fundamental causes of the production of the axle noises. The results of the experiments show that the axle noises are produced basically by reason of torsional and flexural vibrations of the drive lines as a result of the variation in the engine speeds. When the frequencies of these torsional and flexural vibrations are in agreement with the resonance frequency of the whole drive line including the final drive unit, coupled oscillation is brought about which results in production of rapping sounds. The results of the experiments further show that these rapping sounds are not constantly transferred as the rattling and whirring axle noises to the body structures of the motor vehicle but are transferred thereto when they have frequencies falling within a certain range.

It is, therefore, an object of the present invention to provide an improved motor vehicle driving system in which the resonance frequencies of the drive line including the final unit are reduced to such an extent as to fall outside a range in which the noises are transferred to body structures of the motor vehicle.

It is another object of the present invention to provide an improved motor vehicle driving system in which the distribution of the torsional stiffness and mass moment of inertia of the drive line as a whole are modified so as to reduce the resonance frequencies of the drive line to such an extent as to be outside the noise propagation range.

It is still another object of the present invention to provide an improved motor vehicle driving system in which the noises produced within the axle housing are practically isolated from the body structure of the motor vehicle in a construction which is simple and economical to manufacture and which is ready applicable to any existing motor vehicle drive line without extensive change or modification of the drive line which is commonly in use.

These particular objects of the present invention are basically accomplished through provision of an inertial mass means which is rotatable with the pinion drive shaft of the final drive unit and which is positioned substantially coaxially with the pinion drive shaft. The inertial mass means has an amount of weight which is so selected as to be balanced with the pinion drive shaft for thereby reducing the resonance frequencies of the pinion drive shaft to an extent at which the noises produced in the final drive unit are isolated from the body structure of the motor vehicle. The inertial mass means thus forming part of the final drive unit may be constructed as a member which is independent of the component parts of the final drive unit or integral with any of such component parts. Where it is desired that the inertial mass means be constructed as the independent member, the same may be formed as a unitary member of steel or substantially ductile plastics or made up of at least two pieces which are bonded together. In this instance, the inertial mass means may be constructed in the form of a ring which is connected to the pinion driving flange or to a yoke of the rear universal joint through which the pinion driving flange is connected to the propeller shaft. Where, on the other hand, it is desired that the inertial mass means is constructed as integral with any of the component parts of the final drive unit, the same may be in the form of a ring surrounding an outer circumference of the pinion driving flange or extending radially outwardly of the yoke of the rear universal joint. Or otherwise, the inertial mass means may be in the form of a sleeve which is integral with the cylindrical spacer which is positioned intermediate between the front and rear pinion bearings.

The nature of the motor vehicle driving system and the theoretical background of such system will be more clearly understood upon perusal of the following description taken in conjunction with the accompanying drawings, in which.

Figure 12A:
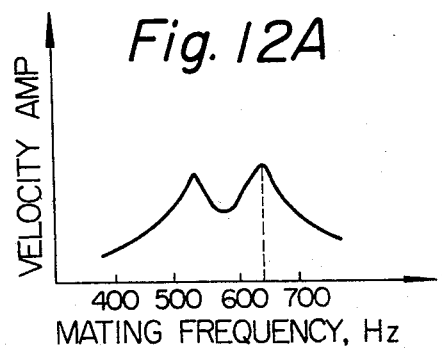
FIG. 12A is a graph showing an example of the variation, in terms of the mating frequency of the driving pinion gear, of the velocity amplitude of the vibrations which are transferred to body structure of a motor vehicle using a prior art final drive unit.
Figure 12B:
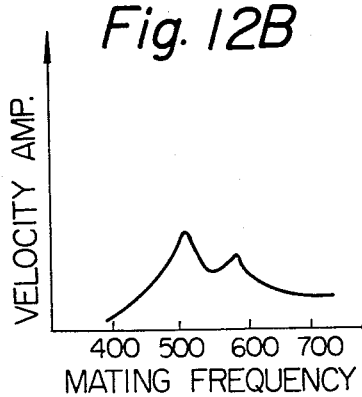
Figure 13:
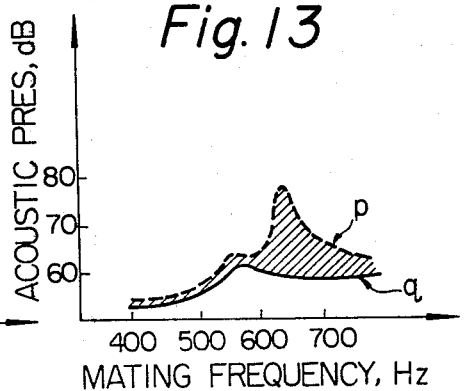

FIG. 12B is similar to FIG. 12A but now shows an example of the variation in the velocity amplitude of the vibrations transferred to the body structure of a motor vehicle using a final drive unit in which the improvement according to the present invention is incorporated; and FIG. 13 is a graph showing an example of the variations in the acoustic pressures, in terms of the mating frequency of the driving pinion gear of the final drive unit, resulting from the axle noises.

Figure 1:
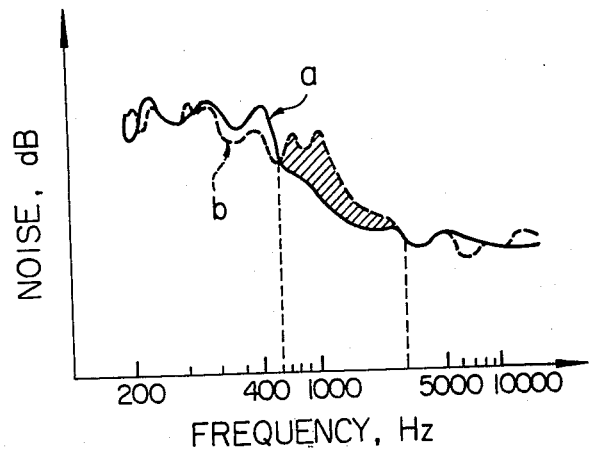
FIG. 1 is a graph showing frequency distributions in the noises transferred to the vehicle cabin in two different modes in which the axle noises are present and absent respectively.
Figure 2:
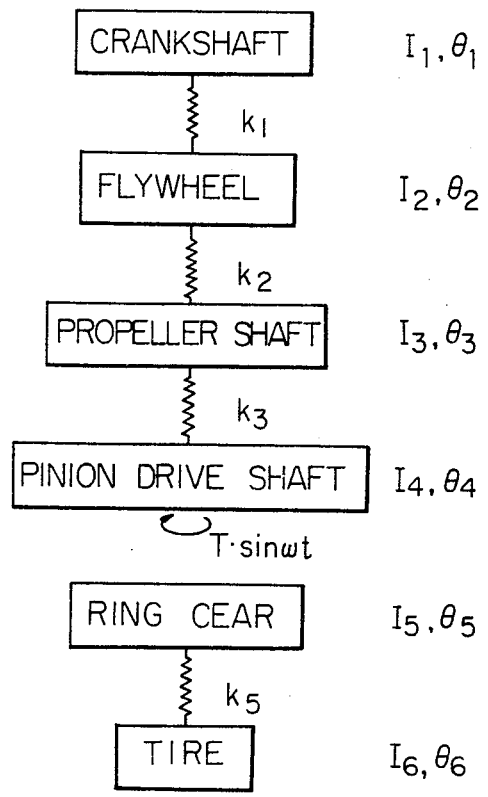
FIG. 2 is a diagram showing, on a simulatory basis, the modes of vibrations of various rotary elements of a motor vehicle drive line.

Reference is first made to FIG. 1 in which the frequency distributions in the noises transferred to the body structure of the motor vehicle as observed in two different modes of vibration are illustrated. In one mode of vibration as indicated by a curve $a$ the axle noises as previously mentioned are absent while, in the other mode of vibration as indicated by a curve $b$ the axle noises are present. The vibrations are indicated in the measure of decibels and the frequencies thereof indicated in terms of Hertz. As seen from this graph, the noises resulting from the repeated impingement between the driving pinion and ring gears of the final drive unit are not constantly transferred in the form of the axle noises to the body structure of the motor vehicle but are transferred to the body structures when the vibrations are produced at frequencies approximately ranging from 300 to 4000 Hz. The present invention thus contemplates reduction of the resonance frequencies of the drive line as a whole to the levels which are lower than a range within which the axle noises are permitted to reach the body structures of the motor vehicle. For this purpose, an analysis is made in the first place into the modes of vibration of the various rotary elements of the motor vehicle drive line on a simulatory basis, as illustrated in FIG. 2. In FIG. 2, the upper four blocks are assumed to represent a series of motor vehicle driving units including an engine crankshaft; a flywheel for the crankshaft; a propeller shaft connected to the crankshaft through a clutch, a clutch shaft, a transmission main shaft and a transmission gear set; and a pinion drive shaft of the final drive unit. The lower two blocks on the other hand are assumed to be indicative of a ring gear (or a crown wheel) driven by the pinion drive shaft through a driving pinion gear; and a tire which is driven by the ring gear through a rear axle shaft. Thus, the mass moments of inertia I in kg·cm·sec$^2$, angular displacements $\theta$ in radians, and torsional stiffnesses K in kg·cm·rad$^1$ of these driving elements are designated with respective subscripts as indicated in the following table.

| | Mass Moment Of Inertia (kg·cm·sec$^2$) | Angular Displacement (radians) | Torsional Stiffness (kg·cm·rad$^1$) | |
|---|---|---|---|---|
| Crankshaft: | $I_1$ | $\theta_1$ | Crankshaft: | $K_1$ |
| Flywheel: | $I_2$ | $\theta_2$ | Clutch, clutch shaft, trans'n main shaft and gear set: | $K_2$ |
| Propeller shaft: | $I_3$ | $\theta_3$ | Propeller shaft: | $K_3$ |
| Pinion driving shaft: | $I_4$ | $\theta_4$ | | |
| Ring gear: | $I_5$ | $\theta_5$ | Rear axle shaft: | $K_5$ |
| Tire: | $I_6$ | $\theta_6$ | | |

Figure 3:
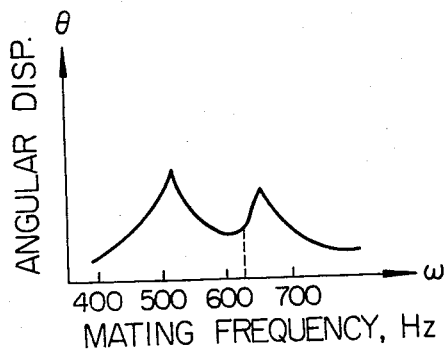
FIG. 3 is a graph showing an example of the variation in angular displacement of the drive pinion gear of the final drive unit in terms of the mating frequency of the pinion gear.
Figure 4:
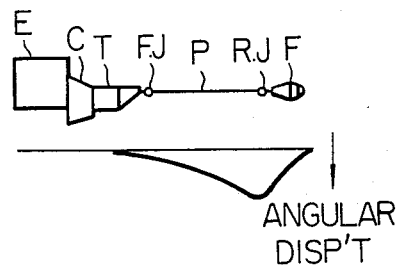
FIG. 4 is a graph showing, in association with a schematic view of a motor vehicle driving system, the mode of vibration as appearing in the driving system when the driving pinion gear is driven with a mating frequency approximating 620 Hz.
Figure 5:
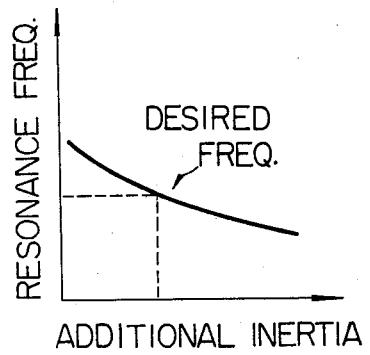
FIG. 5 is a graph showing an example of the variation in the resonance frequency of the drive line as appearing where the driving pinion gear of the final drive unit is provided with an additional inertial mass means.

The differential equations of torsional vibration now hold as follows:

$I_1\ddot{\theta}_1 + K_1(\theta_1 - \theta_2) = 0,$
$I_2\ddot{\theta}_2 + K_2(\theta_2 - \theta_1) + K_2(\theta_2 - \theta_3) = 0,$
$I_3\ddot{\theta}_3 + K_3(\theta_3 - \theta_2) + K_3(\theta_3 - \theta_4) = 0,$
$I_4\ddot{\theta}_4 + K_4(\theta_4 - \theta_3) = T \cdot \sin\omega T,$
$I_5\ddot{\theta}_5 + K_5(\theta_5 - \theta_4) = 0,$ and
$I_6\ddot{\theta}_6 + K_6(\theta_6 - \theta_5) = 0,$ where $\omega$ of the right side of the fourth equation represents the mating frequency of the driving pinion gear and, as such, is the product of the number of revolutions per second of the engine and the number of teeth of the driving pinion gear. Terms carrying the coefficient of viscous damping have been omitted from the above equations for the sake of simplicity of calculation and because of the fact that they are negligibly small. It may be noted that, although the above relationship is constituted by a system with six degrees of freedom, they can be solved in consideration of a relation $\theta_5 = -n \cdot \theta_n$ wherein $n$ stands for a speed reduction ratio. By solving the above differential equations in this manner, it will be brought out that the angular distorsion of the driving pinion gear of the final drive unit varies as indicated in FIG. 3 depending upon the mating frequency of the pinion gear in which the axle noises are produced. The mode of vibration of the whole drive line has been determined for the mating frequency of the pinion gear approximating 620 Hz which falls within a range in which the noises are transferred to the body structure of the motor vehicle, the result being illustrated in FIG. 4. In FIG. 4, the angular distorsions of the drive line are shown in association with the various driving elements of the drive line which are schematically shown as comprising an engine E, clutch C power transmission T, front universal joint F.J., propeller shaft P, rear universal joint R.J. and final drive unit F including the differential and axles. From FIG. 4, it is seen that the torsional vibrations transferred to the body structure of the motor vehicle depend far more upon the mass moments of the propeller shaft and the pinion drive shaft with the driving pinion gear than upon those of the crankshaft and flywheel. This will mean that the axle noises can be eliminated or at least significantly reduced if the resonance frequencies of the propeller shaft and pinion drive shaft are diminished in such a manner that the resonant vibrations are isolated from the vehicle body structure or at least only a limited amount of the vibrations are permitted to reach the body structure. Such purpose will be advantageously accomplished through provision of an inertial mass on either the pinion drive shaft or the propeller shaft. Since, moreover, the angular distorsion of the drive line peaks up in the neighborhood of the pinion drive shaft, the inertial mass may most preferably be attached to the pinion drive shaft in particular. Through provision of such inertial mass in the final drive unit, it is expected that the resonance frequency of the final drive unit varies depending upon the amount of mass which is added to the unit as seen in FIG. 5.

Figure 6:
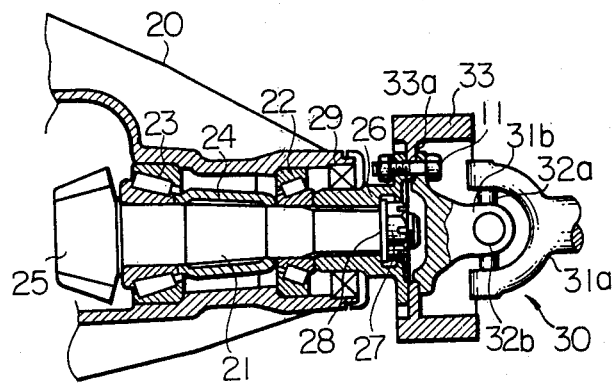
FIG. 6 is a sectional view showing essential parts of the final drive unit incorporating a preferred form of inertial mass means in accordance with the present invention.

The improvement according to the present invention as achieved on the basis of the above described discovery is now illustrated in FIG. 6, such improvement being herein exemplified as being incorporated in the final drive unit of a most common construction which per se is well known to those skilled in the art. The final drive unit, as such, includes a pinion carrier or rear axle housing 20 which is fast on the vehicle body. A pinion drive shaft 21, extending in a fore-and-aft direction of the vehicle body, is rotatably mounted in this rear axle housing 20 through front and rear bearings 22 and 23, respectively. These bearings 22 and 23, which are shown as being tapered roller bearings, are spaced apart from each other by means of a generally cylindrical spacer 24 receiving therein an intermediate portion of the pinion drive shaft 21. The pinion drive shaft 21 carries at its rear end a driving pinion gear 25. Though not shown in the drawing, this driving pinion gear 25 is in constant mesh with a crown wheel or ring gear providing right-angle transfer of the power from the pinion drive shaft and the ring gear, in turn, is in driving engagement with a differential gearing through which the driving power is transferred to right and left rear axles. The mechanism including the differential gearing and axles is well known and rather immaterial for the understanding of the nature of the improvement according to the present invention and, therefore, no detailed discussion as the such mechanism will be herein incorporated. The pinion drive shaft 21 carries at its front end portion a pinion driving or companion flange 26 having a sleeve portion surrounding the front end portion of the pinion drive shaft 21 and a flange portion extending forwardly of the shaft 21. The companion flange 26 is secured to the pinion drive shaft 21 by means of a bolt 27 through a lock-washer 28. Designated by reference numeral 29 is an annular oil seal which is interposed between the sleeve portion of the companion flange 26 and the rear axle housing 20. The companion flange 26 is connected through its flange portion to a rear universal joint 30 by suitable fastening means such as a combination 31 of a bolt and nut. The rear universal joint 30, in turn, is connected to a propeller shaft 32 forming part of the drive line of the motor vehicle. The universal joint 30 is herein shown as being of the Hooke's type, having yokes 31a and 31b connected together by means of mutually crossing pivotal pins 32a and 32b. According to the present invention, now, the final drive unit thus constructed is provided with an inertial mass means which is in the form of a wheel 33 having a generally circular wall section 33a. This wheel 33 is held in position with its circular wall section securely interposed between the flange portion of the companion flange 26 and the rear yoke 31b of the universal joint 30 by the use of the combination bolt and nut 31, as illustrated. This wheel 33 acting as the inertial mass means is herein assumed to be constructed of a unitary rigid member which may be made of steel. If preferred, however, the wheel 33 may be made up of two or even more component elements, an example of such construction being illustrated in FIGS. 7A and 7B.

Figure 7A:
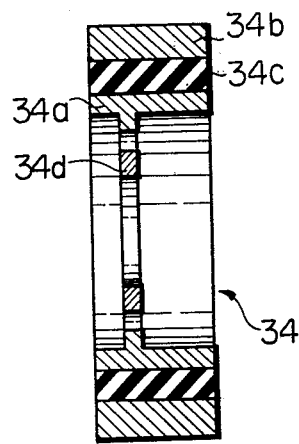
FIG. 7A is a cross sectional view showing another preferred form of inertial mass means applicable to the final drive unit shown in FIG. 6.
Figure 7B:
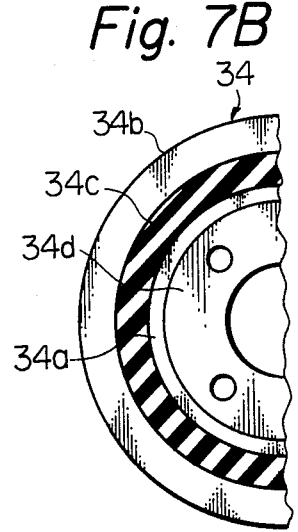
FIG. 7B is a front end view of the inertial mass means illustrated in cross section in FIG. 7A.

In FIGS. 7A and 7B, the wheel, which is now designated by reference numeral 34, is made up of inner and outer rings 34a and 34b, respectively, of a rigid material and an intermediate ring 34c of an elastic material such as rubber or ductile plastics. The intermediate ring 34c is securely attached to contact surfaces of the inner and outer rings 34a and 34b, respectively, by means of sintering for instance. The inner ring 34a has a generally annular wall section 34d through which the wheel 34 in its entirety is secured to the companion flange 26 in a manner shown in FIG. 6. If otherwise preferred, the wheel as a whole may be constructed by a unitary member of an elastic material although an example of such construction is not herein illustrated.

As an alternative to the above described inertial mass means which is attached to the companion flange through use of the existing fastening means or, where preferred, by suitable, newly added fastening means, the inertial mass means may be formed as integral with any of the component parts of the final drive unit or the parts which are associated with the final drive unit.

Figure 8:
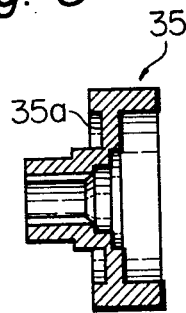
FIGS. 8 to 10 are cross sectional views each showing still another preferred form of inertial mass means to be incorporated in the final drive unit shown in FIG. 6.
Figure 9:
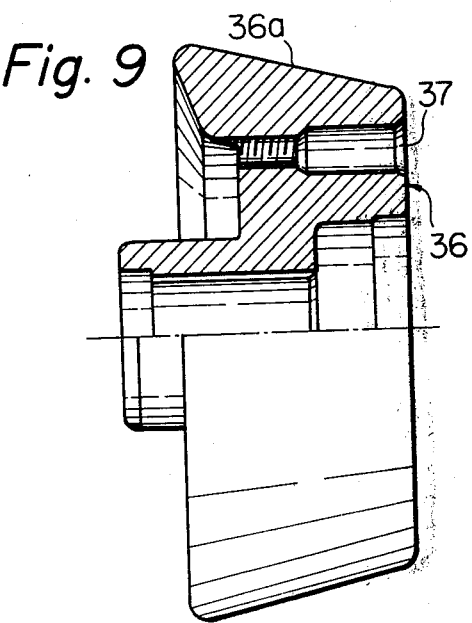

FIG. 8 illustrates an example in which the inertial mass means is constructed as a rigid wheel 35 which is integral with the flange portion of the companion flange 26 through an annular wall section 35a. FIG. 9 illustrates another example in which the companion flange, now designated by reference numeral 36, has a flange portion which is so configured as to have a radial extension 36a, or, in other words, have an increased thickness with a consequent increase in the mass moment of inertia of the companion flange 36. The combination companion flange and inertial mass means 36 is connected in its entirety to the universal joint (not shown) through a bolt 37 or other suitable fastening means.

Figure 10:
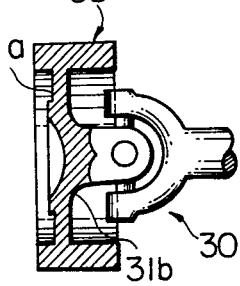

FIG. 10 illustrates still another example in which the inertial mass means is formed as integral with the rear univeral joint 30. The mass means in this example is constructed as a rigid wheel 38 which is integral with the rear yoke 31b of the universal joint 30 through an annular wall section 38a.

Here, it is to be noted that the specific configuration of the wheel 34 illustrated in FIGS. 7A and 7B are essentially applicable to any form of the inertial mass means shown in FIGS. 8 to 10. In this instance, the wheel 35 or 38 shown in FIG. 8 or 10, respectively, or the thickened flange portion 36a of the companion flange 36 may form part of the inner ring 34a surrounded by the intermediate and outer rings 34c and 34d, respectively. By preference, the outer ring 34b may be dispenced with in the configuration above described.

Figure 11:
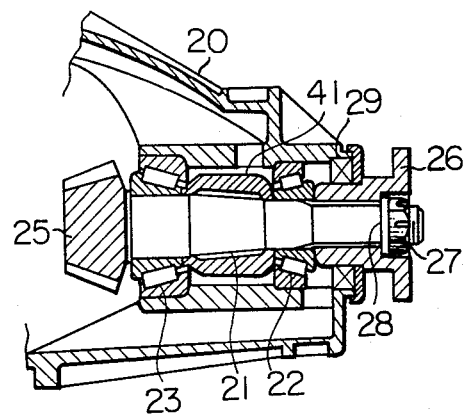
FIG. 11 is a sectional view showing essential parts of a final drive unit incorporating the improvement, in still another preferred form, according to the present invention.

FIG. 11 illustrates a further modified form of inertial mass means which is incorporated in the final drive unit in accordance with the present invention, wherein parts corresponding to those appearing in FIG. 6 are designated by like reference numerals. The inertial mass means in the shown final drive unit is provided through modification of the spacer which is now designated by reference numeral 41. The spacer 41 in this instance has a thickness which is increased to provide an additional mass moment of inertia, thus serving not only to have the pinion bearings 22 and 23 spaced apart from each other but to act as the inertial mass means. It may thus be said that the inertial mass means is formed as integral with the spacer 41 in the shown construction arrangement.

Whichsoever form the inertial mass means may take in the final drive unit, it is important that such inertial mass means be positioned to have its center of gravity aligned with the axis of the pinion drive shaft and to provide a mass moment of inertia which is pertinent to reduce the proper vibration frequency of the torsional and flexural vibrations of the pinion drive shaft to such an extent that the levels of the vibrations resulting from the resonance of the proper vibrations with the mating vibrations of the driving pinion gear are lowered to a range in which such vibrations are practically isolated from the body structures of the motor vehicle. The final drive unit incorporating the improvement according to the present invention is thus expected to significantly contribute to preventing an ingress of the axle noises to the vehicle cabin under various modes of operation of the motor vehicle.

FIG. 12A shows the results of the experiments which were conducted to determine the mode of vibrations of the pinion drive shaft in a motor vehicle equipped with an engine with a 1200cc piston displacement. The curve of FIG. 12A thus indicates the variation in the velocity amplitude of the vertical vibration of the pinion drive shaft depending upon the mating frequency in hertz of the driving pinion gear of the final drive unit. From this curve, it is seen that the torsional and flexural vibrations of the pinion drive shaft are coupled with the resonance frequency of approximately 640 Hz of the drive line including the final drive unit. This will mean that the transfer of the axle noises to the vehicle cabin can be precluded if the resonance frequency of the drive line is reduced to approximately 580 Hz which corresponds to the minimal value of the velocity amplitude. From the previously presented differential equations accounting for torsional vibrations it has been known that the additional inertial mass suitable to achieve this purpose should have the following attributes.

Additional mass moment of inertia: approx. 0.2 kg.mm.sec$^2$

Additional inertial mass: approx. 0.7 to 1.0 kg.

The inertial mass means satisfying these conditions was mounted between the propeller shaft and companion flange with the result that the mode of vibrations of the pinion drive changed from that shown in FIG. 12A to that shown in FIG. 12B. FIG. 13 shows the levels in acoustic pressure of the noises transferred to the vehicle cabin in terms of the mating frequency of the driving pinion of the final drive unit. In FIG. 13, curves p and q are in correspondence with the curves of FIGS. 12A and 12B, respectively, and as such the curve p indicates the noise level in the vehicle cabin where the final drive unit of the prior art construction is used while the curve q indicates the noise level as reached where the final drive unit incorporating the improvement according to the present invention is used. Comparison between these curves p and q will clearly indicate that the unpleasant noises resulting from the axle noises are reduced to a remarkably low level especially in the frequency range of 600 to 700 Hz.

It will now be appreciated from the foregoing description that the improvement according to the present invention, which in itself is notably advantageous for the reduction of the noises in the vehicle cabin, can be readily put into practice in a simple and economical construction. Where the inertial mass means is to be formed as integral with the companion flange or rear universal joint and/or the spacer as previously described, the improvement according to the present invention can be achieved through simple modification of the named component parts, viz., without use of an increased number of parts. Where, on the other hand, the inertial mass means is to be formed independently of the component parts of the final drive unit or the parts associated therewith, the inertial mass means may be secured in place through use of the existing fastening means such as the bolt interconnecting the companion flange and rear universal joint. In this instance, too, the improvement according to the present invention can be readily achieved without resort to extensive modification of the existing final drive unit. Last but not least, it may be added that no restriction is created on the maximum revolusion speed of the drive line as a result of provision of the additional inertial mass means.

What is claimed is:

1. A driven vehicle comprising a vehicle body, a propeller shaft and a final drive unit, the final drive unit comprising a pinion drive shaft rotatable supported by pinion bearings in an axle housing, a spacer provided on a portion of the pinion drive shaft spacing the bearings from each other, a pinion driving flange provided on the pinion drive shaft and rotatable therewith, and a rear yoke of a rear universal joint fixedly connected to and rotatable with the pinion driving flange, and an inertial mass of a predetermined weight coaxially coupled with and rotatable with the pinion drive shaft, said inertial mass having a circular wall section interposed between said rear yoke said pinion driving flange and secured thereto said mass being positioned with its center of gravity aligned with the axis of said pinion drive shaft adjacent a forward end portion thereof, so as to increase the predetermined magnitude of the moment of inertia of the pinion drive shaft to cause a reduction in the otherwise occurring resonance frequency of the pinion drive shaft and in the vibrations produced in the final drive unit and therefrom transmitted to the vehicle body.

2. A vehicle as claimed in claim 1 wherein the inertial mass comprises a wheel formed separately from any component part of the final drive unit and held stationary relative to the pinion drive shaft by fastening means.

3. A vehicle as claimed in claim 1 wherein the inertial mass comprises a unitary member.

4. A vehicle as claimed in claim 3 wherein the unitary member is constructed of a rigid member.

5. A vehicle as claimed in claim 3 wherein the unitary member has an elastomer portion.

* * * * *